M. J. HAMMERS.
AUXILIARY SEAT FOR VEHICLES.
APPLICATION FILED JULY 3, 1915.
1,203,729.
Patented Nov. 7, 1916.
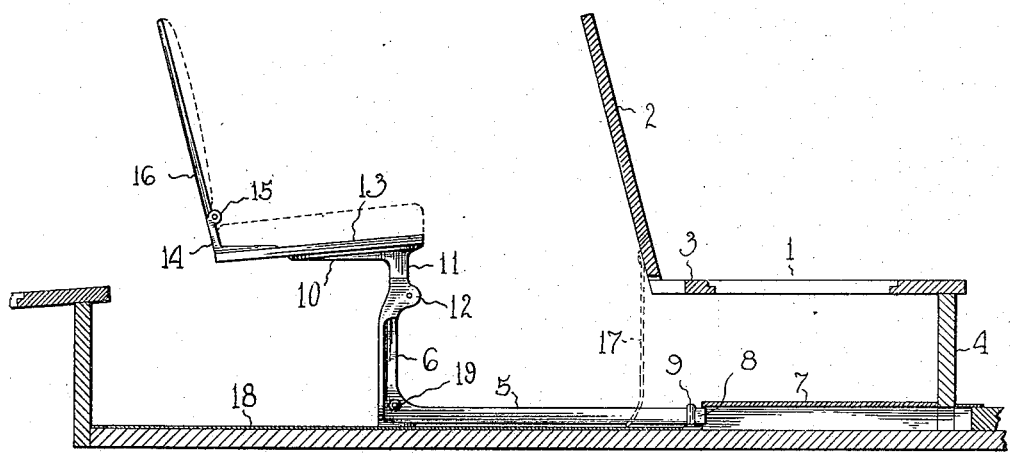
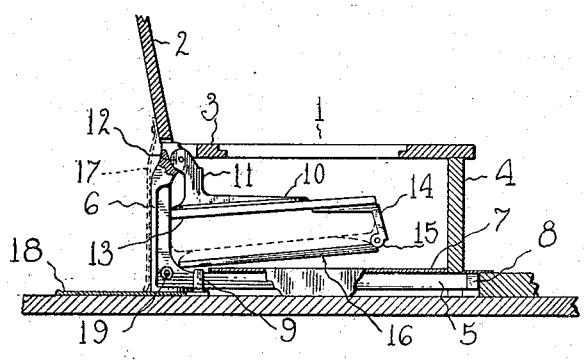
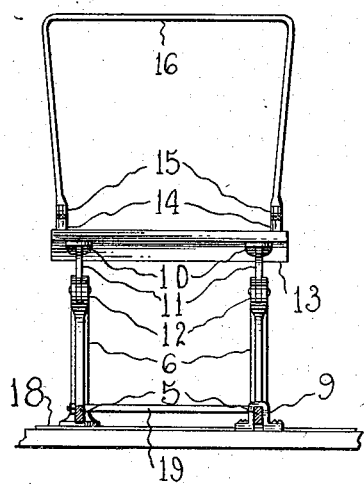
Witnesses
Anna M. Dorr
Arthur F. Draper
Inventor
Morgan J. Hammers
By
Attorneys

UNITED STATES PATENT OFFICE.

MORGAN J. HAMMERS, OF DETROIT, MICHIGAN.

AUXILIARY SEAT FOR VEHICLES.

1,203,729.      Specification of Letters Patent.      Patented Nov. 7, 1916.

Application filed July 3, 1915. Serial No. 37,983.

*To all whom it may concern:*

Be it known that I, MORGAN J. HAMMERS, a citizen of the United States of America, residing at Detroit, in the county of Wayne and State of Michigan, have invented certain new and useful Improvements in Auxiliary Seats for Vehicles, of which the following is a specification, reference being had therein to the accompanying drawings.

This invention relates to seats for vehicles and more especially to an arrangement thereof whereby spare seats that are concealed when not in use, are readily swung out into position for occupants, no means being needed to clamp them in extended position and the entire space occupied by them when in use, being free and unobstructed when the seats are folded.

The seats are particularly designed for use in the tonneau of an automobile between the front and back seats.

The invention consists in the matters hereinafter set forth, and more particularly pointed out in the appended claims.

In the drawings, Figure 1 is a view, partially in longitudinal section and partially diagrammatic, of a vehicle body provided with a seat that embodies features of the invention, shown in operative position. Fig. 2 is a corresponding view showing the seat in folded position; and Fig. 3 is a view in front elevation of the seat.

Referring to the drawings, the front seat 1 of a vehicle has that portion of the back 2 thereof below the seat platform 3, cut away, thereby affording a space under the seat and behind the heel board 4. A pair of flanged and ribbed standards having horizontally disposed arms 5 and upright posts 6, slide under guides 7 disposed beneath the seat deck 3 on the vehicle floor. A lateral projection 8 on each standard coöperates with a clip 9 adjacent the rear end of the guide 7 to prevent the withdrawal of the standards from the guides, or other suitable stops may be used. The standards are preferably formed with the members 5 and 6 integral, although this is not necessary, and the cross section thereof and of the guide members 6 is immaterial, provided the parts present the necessary lightness and rigidity, and maintain themselves in operative position, when extended. A pair of seat irons 10 each have a depending strut 11 at one end thereof which is pivotally secured to the post 6 of a standard, preferably by a hinge member 12 that breaks forward, but holds the seat iron 10 in a substantially horizontal position when the latter is swung back. A suitably upholstered seat 13 is secured on the irons 10. Knee-irons 14 with rule-joints 15, support a back frame. The joints break forwardly but maintain the back frame in proper relation to the seat 17 when the latter is upturned. Or the knee irons 14 may be directly connected to or formed on the seat irons 10. A cross-stay 19 connects the standards, or in fact, the standards may be replaced by a single piece of sufficient length.

The parts are so proportioned that when the back 16 is turned onto the cushion seat 13 and the latter is in turn folded forward upon the hinges 12, the entire structure is bodily movable inwardly beneath the seat deck 3. When so folded and placed, an apron 17 depending from the back of the seat 1, conceals the folded seat, and furnishes a finish to the seat back. In order to prevent rattling, the standard arms 5 are usually arranged to rest upon a carpet 18 or mat which covers the carriage floor, or other cushioning stops or anti-rattling devices may be used. This also operates to frictionally hold the seat in any position which may meet the requirements of the occupant in the seat and also of the one in the seat back of it, as it may be slid in or out as desired, and remains in any adjusted position.

It is to be understood that one or more of these seats may be provided, so that the available space, depending on the width of the vehicle body, is used. When the seats are extended they afford free foot room in front of them and give ample clearance to the occupants of the seat back of them. Because of the available space for the seats when folded, the seats may be adequately upholstered to give comfort in riding. Furthermore, when collapsed, they are supported by the standards clear of the floor, so that they are readily drawn out again. When under the front seat, they are entirely protected from dirt. Furthermore the seats may be used behind divided front seats as they can be constructed of any width.

Obviously, changes in the details of construction may be made without departing from the spirit of the invention, and I do not care to limit myself to any particular form or arrangement of parts.

What I claim is:—

1. In a vehicle, the combination with the floor and a seat thereon having an opening in the back below the seat deck of guides housed under the seat and disposed longitudinally of the vehicle, standards having forwardly extending arms in sliding engagement with the guiding means, a seat articulated to the standards to fold forward into an inverted position over the standard arms and to fold back on the standards into sitting position and a back articulated to the seat to fold downwardly onto the latter and rearwardly into sitting position, the standards resting on the portion of the floor back of the seat when extended and leaving that portion of the floor unimpeded and clear when telescoped with the guides.

2. In a vehicle, the combination with the floor a back seat and a front seat having an open back below the seat deck, of guiding members housed under the front seat extending rearwardly from the heel board, standards having forwardly extending arms in sliding engagement with the guides, a seat articulated to the rear upright end portions of the standards to fold downwardly into an inverted position at an interval above the standard arms and to turn back of the standards into sitting position and a back articulated to fold downwardly onto the seat and rearwardly into operative position, the standards resting on the portion of the floor back of the seat when extended and leaving that portion of the floor entirely unimpeded when telescoped with the guides.

3. In a vehicle, the combination with a back seat and a front seat having an opening in the back thereof below the seat deck, of guiding means underneath the forward seat disposed longitudinally of the vehicle, L-shaped standards the horizontal portions of which are in sliding engagement with the guiding means, seat irons articulated on the upright portions of the standards by rule joints that break forwardly, a back frame and means articulating the back frame to the seat to swing forwardly onto the seat, the seat and attached parts when folded and moved forward on the guides, being housed completely by the front seat, the standards resting on the portion of the floor back of the seat when extended and leaving that portion of the floor entirely unimpeded when telescoped with the guides.

In testimony whereof I affix my signature in presence of two witnesses.

MORGAN J. HAMMERS.

Witnesses:
 ANNA M. DORR,
 C. R. STICKNEY.